Figure 1:
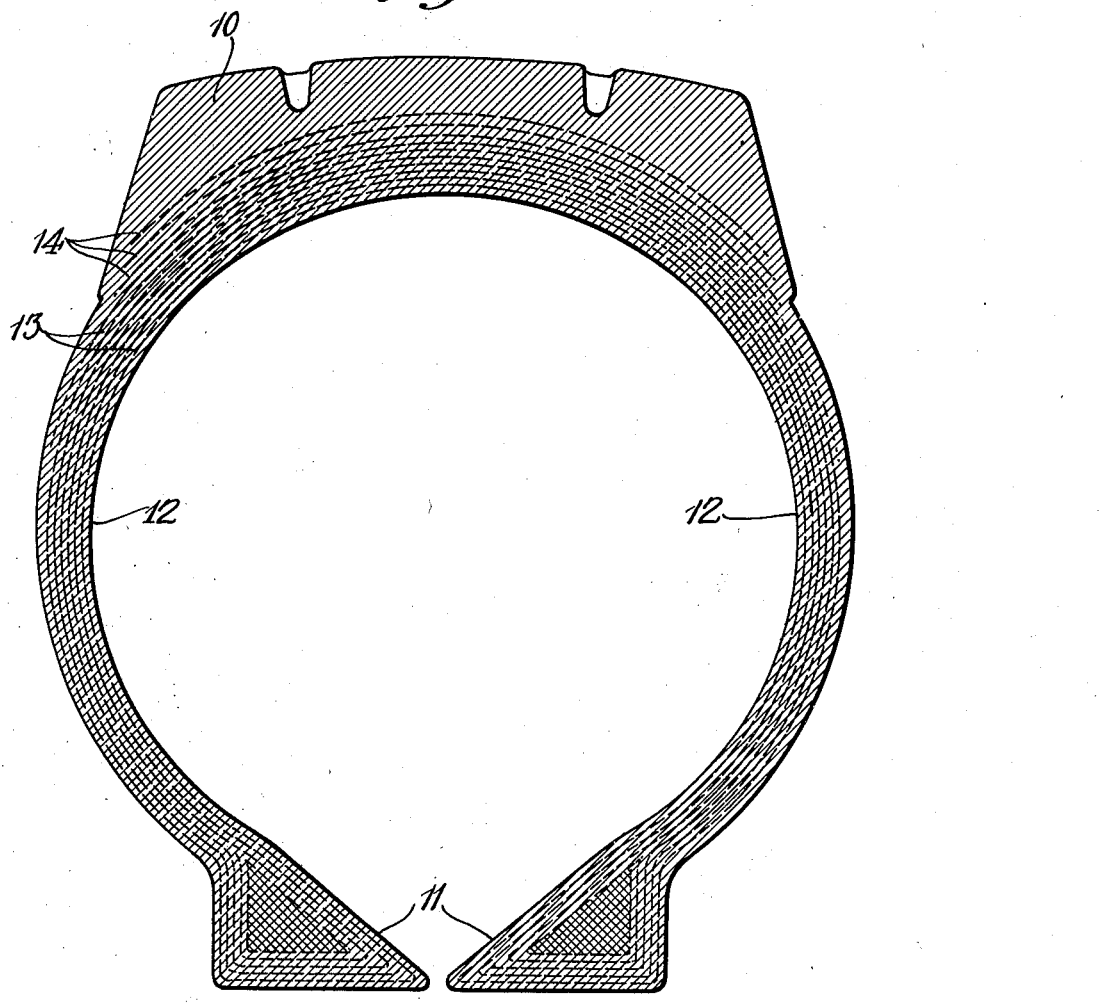

Sept. 29, 1936.   E. W. MADGE ET AL   2,056,012
PNEUMATIC TIRE
Filed Dec. 13, 1934   3 Sheets-Sheet 2

INVENTORS
EVELYN WILLIAM MADGE.
FREDERICK BENJAMIN JONES.
BY DONALD PARKINSON.

ATTORNEYS

Sept. 29, 1936.          E. W. MADGE ET AL          2,056,012
                            PNEUMATIC TIRE
                       Filed Dec. 13, 1934          3 Sheets-Sheet 3

INVENTORS
EVELYN WILLIAM MADGE.
FREDERICK BENJAMIN JONES.
BY DONALD PARKINSON.

ATTORNEYS

Patented Sept. 29, 1936

2,056,012

UNITED STATES PATENT OFFICE 2,056,012

PNEUMATIC TIRE

Evelyn William Madge, Wylde Green, Sutton Coldfield, Frederick Benjamin Jones, Handsworth, Birmingham, and Donald Parkinson, Erdington, Birmingham, England, assignors to Dunlop Tire and Rubber Corporation, Buffalo, N. Y., a corporation of New York Application December 13, 1934, Serial No. 757,332
In Great Britain December 16, 1933

2 Claims. (Cl. 152—13)

This invention concerns improvements in and relating to pneumatic tires upon which the progress of vehicle design imposes conditions of ever increasing severity and under which the modern tire is expected to give the same service notwithstanding the additional stresses to which the various parts of the cover are subjected.

The body or carcase of the tire is called upon to transmit such stresses from the tread of the tire through various superposed layers until they are transmitted to the hub or rim.

For instance to the stresses which may to some extent be foreseen as normal and among which may be numbered those due to inflation, to the load carried by the tire, and to the local flexure to which successive portions of the tire are subjected during its contact with the road surface, must be added other stresses, the severity and effects of which are continually increasing, and difficult to calculate and to provide against in the designing of the casing.

In particular to the above stresses may be added or combined the circumferential stresses which are of variable and reversible type and are due to developments in acceleration and braking which may be of a comparatively violent nature, also the heating and other effects due to centrifugal force particularly where tires are used at high speeds for racing purposes.

It will be readily understood that it is of the greatest importance so to construct a tire carcase that the various plies and tread and breaker strip portions shall present an improved resistance to interply separation either circumferentially or transversely of the tire with its accompanying development of friction and heat, setting up or encouraging partial disintegration of the materials composing the tire and those by which the constituent parts or layers are flexibly held together.

Such internal damage and the danger therefrom is not readily or immediately apparent to the user since the outer surface may appear sound though internal action may have begun or may have been in course of progress for some little time until a condition is reached when partial separation of the various parts of the tire occurs.

The object of the present invention is to provide an improved adhesion between the elements constituting the body of the tire of a nature such as to provide a greatly increased resistance to forces tending to separate them whereby the efficiency and capacity for service of the tires shall be greatly enhanced.

In particular the present invention aims at preventing the development of tread, undertread or casing ply looseness particularly between rubber-cotton joints in the tire such as may be due to some one, or to a combination, of the causes set forth above.

According to our invention, discontinuous fibres are provided in the layers of rubber in contact with the textile material of the tire.

The fibres may be carded or combed fibres and may be initially coated with rubber prior to their introduction into the rubber compound which ultimately forms the rubber layer in contact with the textile material.

One or more layers of rubber containing fibres may be interposed between the under tread and breaker strip or strips. Alternatively or in addition one or more layers of rubber having imbedded fibres may also be interposed between the breaker strip or strips and the cord or fabric plies constituting the body of the casing.

One or more layers comprising rubber having fibres incorporated may also be interposed between any or all of the plies or pockets of which the tire is composed, or between chafer strips, beads, toes, or other fabric and rubber insulating layers adjacent thereto.

The fibres may be of vegetable origin or of mineral origin, of animal origin and of synthetic origin.

For instance the fibres incorporated may consist wholly or partly of vegetable fibres such as cotton, hemp, jute, ramie, sisal, or of mineral fibres such as asbestos, slag-wool or glass wool, or of animal fibres such as hair, wool, or silk, or of artificial fibres such as artificial silk, hair, or synthetic cellulose products or of mixtures of such fibres.

The fabric components of the tire may consist of or comprise weftless or woven cord or canvas.

The manufacture of the kind of tires described may also be characterized by a process comprising dispersing discontinuous fibres within a rubber compound with which the cord or textile layers are topped and if desired by an initial process wherein the fibres are coated prior to dispersion with a composition containing rubber, and in one composition the mix may include 5 to 10% of fibres by weight, but other proportions are not excluded. It has been found that improved results are obtained up to an amount of fibre of 20% by weight of the rubber content of the mixing.

It is important that the fibres be introduced in a dispersed manner in order to prevent any tendency to matting, and the formation of agglomerates.

To ensure adequate individual insulation and dispersion, the fibres are employed in carded or combed form and their introduction into the tire may be effected directly in this form.

Preferably the introduction is facilitated and effected by first coating the fibres with a thin rubber layer or envelope in any convenient manner.

The fibres employed may be of any suitable length or thickness as may be found desirable the fibres of heat insulating or heat conductive character may be incorporated and any of the kinds of fibres mentioned may be used with or without admixture with one another in the proportion required to provide the required additional resistance to separative stresses.

Where insulation layers of rubber are employed, it will be understood that any one or more or all of such insulation layers may themselves comprise dispersed fibres or may be laid upon an adjacent surface whether of cord or rubber which has been topped with rubber containing dispersed combed or carded fibre of the kinds and in the manner specified.

Figure 2:
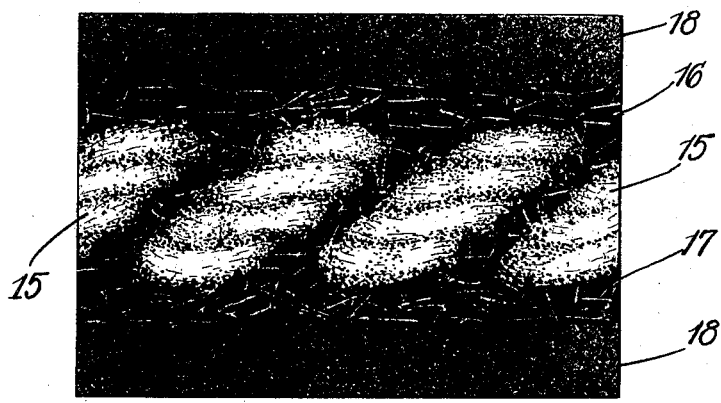
Figure 3:
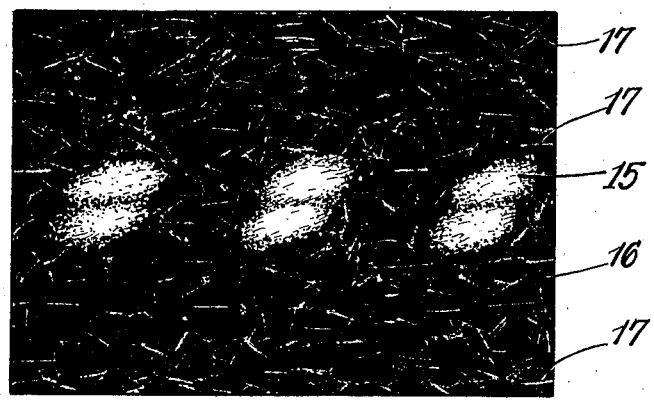
Figure 4:
Figure 5:
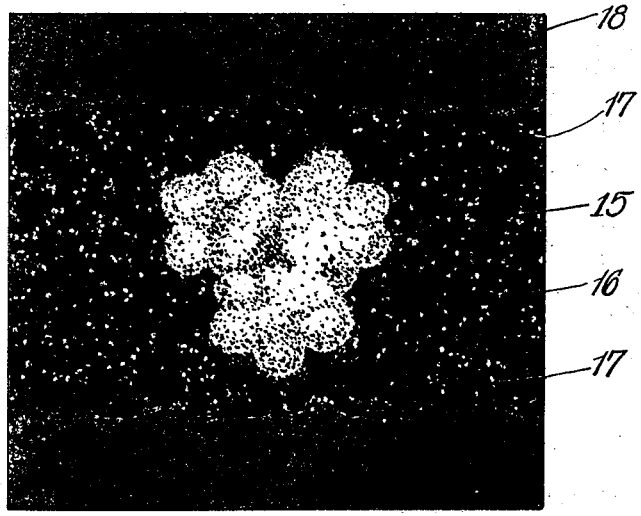

The invention is illustrated in the accompanying drawings in which Fig. 1 shows a cross-section of a tire embodying the invention; Fig. 2 is a section cut along the plane of the topping rubber and showing a section of a cord through its center, this drawing corresponding to a photo-micrograph of a magnification of about 50; Fig. 3 is a similar section on a plane passing through the edge of the cord; Fig. 4 is a radial section of a portion of the tire parallel to the axis of the tire and substantially at right angles to the sections 2 and 3; Fig. 5 is a section on a somewhat larger scale, as for example, in magnification of about 65 at right angles to the plane of the topping rubber and showing a section of a cord surrounded by fibre and lighter bands of cushion and insulation rubber.

In Fig. 1 the tire is shown as comprising a tread portion 10, bead portions 11 and connecting side walls 12. A number of usual cord fabric layers 13 extend from one of the bead edges through the side walls and tread to the opposite bead edge. There may be ony suitable number of such cord fabrics as, for example, 4 or 6. Breaker strips 14 may be provided in the tread portion between the cord fabrics and the tread. This construction is a usual tire construction.

Each of the fabric layers 13 and breaker strips 14 is made up of a number of cords 15 shown in Figs. 2, 3, 4 and 5. These cords are embedded in a mass of rubber 16 which contains fibres 17 dispersed throughout the rubber in separated unmatted condition or position. The fibres 17 extend from a close association with the cords 15 out and through the mass of rubber 16. The masses of rubber 16 enclosing one cord fabric may be united directly with or be integral with the mass of rubber containing an adjacent cord fabric or it may be separated from the adjacent cord fabric and embedding rubber by means of a separating or insulating layer 18 as shown in Figs. 2 and 6. The discontinuous separated fibres 17 serve to firmly unite and anchor the textile components into the rubber, so that the plys cannot be stripped from the intermediate rubber layers as in those cases where there is no anchorage between the plys and the rubber layers.

Having now described our invention we claim:

1. A pneumatic tire comprising a rubber body having superposed layers of fabric embedded therein throughout the tread and side wall areas of said tire, and separated from each other by intervening rubber composition, said composition having fibers individually dispersed therein and in contact with the fabric in said tread and side wall areas.

2. A pneumatic tire comprising a rubber body having superposed layers of fabric embedded therein in the tread and side wall areas, and separated from each other by intervening rubber composition, said rubber composition containing fibers individually dispersed therein and in contact with said fabric throughout the tread portion thereof, the quantity of fiber in said intervening rubber composition being less than the quantity of rubber therein.

EVELYN WILLIAM MADGE.
FREDERICK BENJAMIN JONES.
DONALD PARKINSON.

CERTIFICATE OF CORRECTION

Patent No. 2,056,012.     September 29, 1936.

EVELYN WILLIAM MADGE, ET AL.

It is hereby certified that error appears in the above numbered patent requiring correction as follows: In the grant, lines 1 to 5, and in the heading to the printed specification, for "EVELYN WILLIAM MADGE, WYLDE GREEN, SUTTON COLDFIELD, FREDERICK BENJAMIN JONES, of Handsworth, Birmingham, and DONALD PARKINSON, of Erdington, Birmingham, England, assignors to DUNLOP TIRE AND RUBBER CORPORATION, of Buffalo, New York, a corporation of New York" read EVELYN WILLIAM MADGE, of Wylde Green, Sutton Coldfield, Warwickshire, FREDERICK BENJAMIN JONES, of Handsworth, Birmingham, Warwickshire, and DONALD PARKINSON, of Erdington, Birmingham, Warwickshire, England, assignors to DUNLOP TIRE AND RUBBER CORPORATION, of Buffalo, New York, a corporation of New York; and that the said Letters Patent should be read with this correction therein that the same may conform to the record of the case in the Patent Office.

Signed and sealed this 8th day of December A. D. 1936.

Henry Van Arsdale
Acting Commissioner of Patents.

(Seal)